April 30, 1946.  A. F. HICKMAN  2,399,226
VEHICLE SPRING SUSPENSION
Filed April 12, 1944  5 Sheets-Sheet 3

INVENTOR
Albert F. Hickman
BY
Popp and Popp
ATTORNEYS

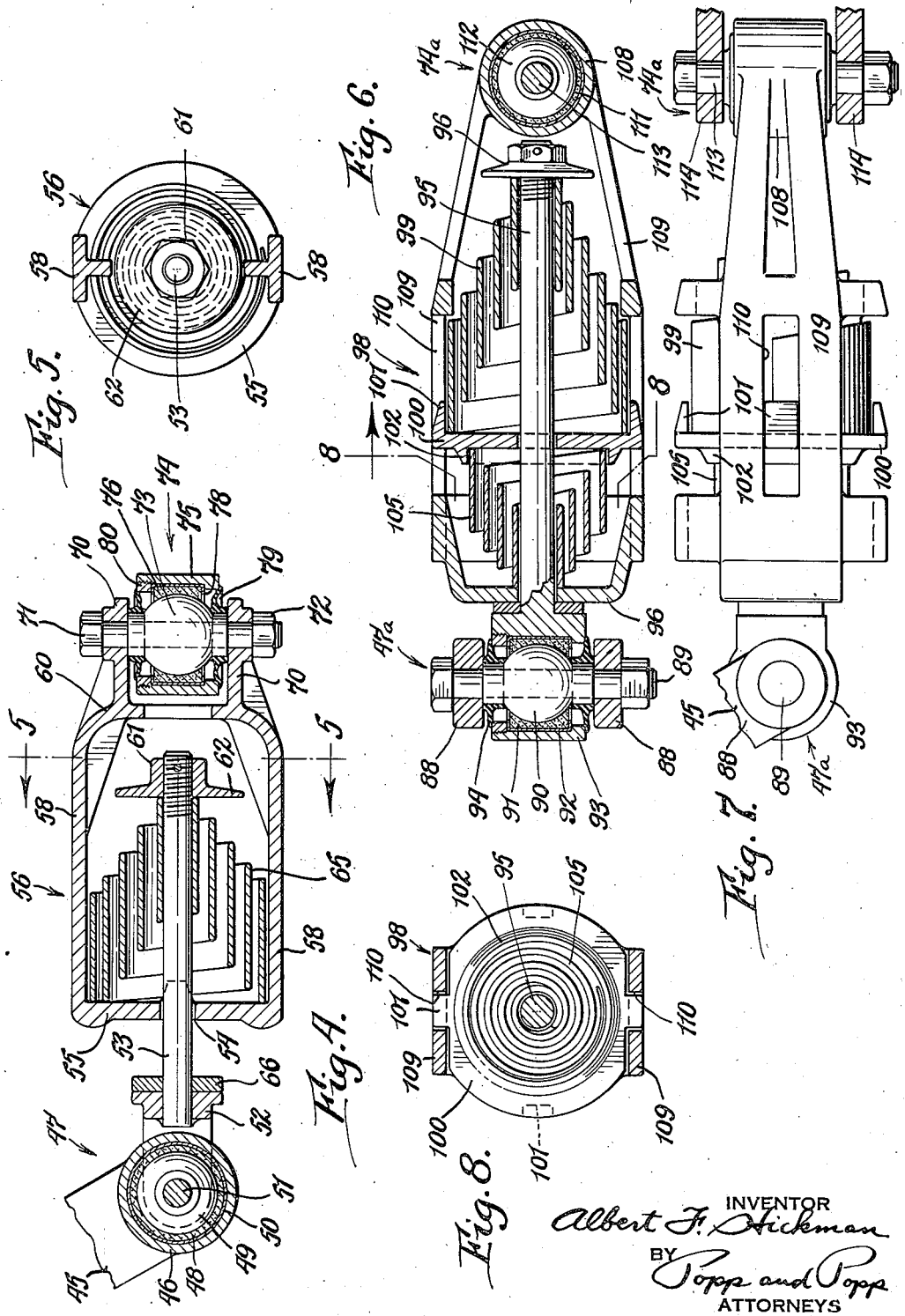

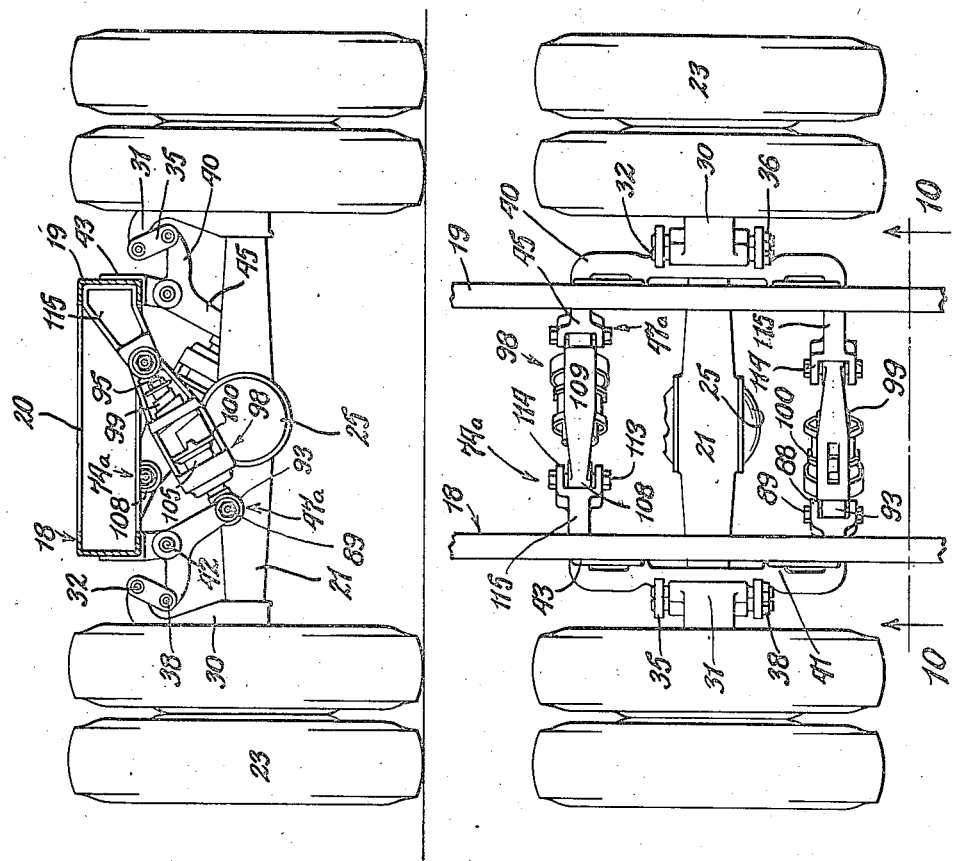

Patented Apr. 30, 1946

2,399,226

UNITED STATES PATENT OFFICE 2,399,226

VEHICLE SPRING SUSPENSION

Albert F. Hickman, Eden, N. Y., assignor to Hickman Pneumatic Seat Co., Inc., Eden, N. Y., a corporation of New York Application April 12, 1944, Serial No. 530,697

13 Claims. (Cl. 280—104.5)

This invention relates to a spring suspension for vehicles and more particularly to a spring suspension for single or multiple axles in which each axle is permitted to move against geometric resilient resistance, both laterally and longitudinally, relative to the vehicle frame, both when the vehicle has a low percentage of load variation and also when it has a high percentage of load variation. While the invention is more particularly described in connection with a highway vehicle, it is also applicable for use on other land vehicles, such as railroad cars.

One of the objects of the invention is to reduce and cushion the lateral impacts from the axle against either the frame or the springs of a vehicle which is subject to either a high or a low percentage of load variation.

Another object of the invention is to provide such a spring suspension in which the resilient resistance is provided by axially compressible springs.

Another object is to provide such a spring suspension including axially compressible springs which is compact and in particular operates with little axial movement of the axially compressible springs.

Another object is to provide such a suspension in which such axially compressible springs are in the form of volute springs which operate without friction between their convolutions and provide the necessary action in a limited range of movement.

Another object is to provide such a suspension in which both heavy and light volute springs are employed, the light springs providing freedom of movement of the suspension when riding empty or lightly loaded and the heavy springs providing the necessary resilience under full load conditions.

Another object is to accomplish the above objects regardless of whether the vehicle is loaded or unloaded and without imposing undue end thrusts on the various pivotal connections which connect the axles to the frame.

Another object is to provide such a spring suspension in which movements of the axle, or of either one or both of the tandem axles are, at the same time, opposed by a geometric resilient resistance and in which either the axle, or one or both of the tandem axles are opposed by a total resilient force of such nature as to take care of a high percentage of load variation.

Another object is to provide such a spring suspension in which geometric resilient resistance is obtained in a compact structure and is free from lubrication difficulties.

Another object is to provide a tandem axle spring suspension in which one or both of the tandem axles are self-steering so that, when rounding a curve, said tandem axles are caused to assume such an angle relative to each other as will enable a pure rolling action to be obtained and thereby reduce tire scuff and increase tire and gasoline mileage.

Another object of the invention is to provide such a tandem axle spring suspension which includes a compensating means connecting the companion ends of the tandem axles and through which the excess load on either axle is transmitted to the other axle.

Another object of the invention is to provide such a tandem axle suspension in which the distribution of the load from the tandem axles to the frame is at a plurality of points.

Another object of the invention is to provide such a tandem axle suspension which is of much lower weight as compared with conventional leaf spring tandem axle suspensions now in use. This is accomplished by substituting small levers and light volute springs for the conventional leaf springs and by the elimination of cross shaft stabilizers.

Numerous other objects of the invention and practical solutions thereof are disclosed in detail in the following description and drawings, in which:

Fig. 4 is an enlarged vertical central section through one of the yokes for the volute springs which provide the resilient resistance for the spring suspension, this figure also showing the manner in which the volute spring yoke is connected with the other parts of the suspension.

Fig. 5 is a generally vertical sectional view taken on line 5—5, Fig. 4.

Fig. 6 is a generally horizontal sectional view of a modified form of the yoke for volute springs and the means for connecting it with the other parts of the spring suspension.

Fig. 7 is a side elevational view of the modified form of yoke for the volute springs and its connecting means, shown in Fig. 6.

Fig. 8 is a generally vertical sectional view taken on line 8—8, Fig. 6.

Fig. 9 is a top plan view of the suspension embodying the invention applied to a single axle in contradistinction to the tandem axle structures shown in the preceding figures.

Fig. 10 is a transverse section taken on line 10—10, Fig. 9.

Figure 1:
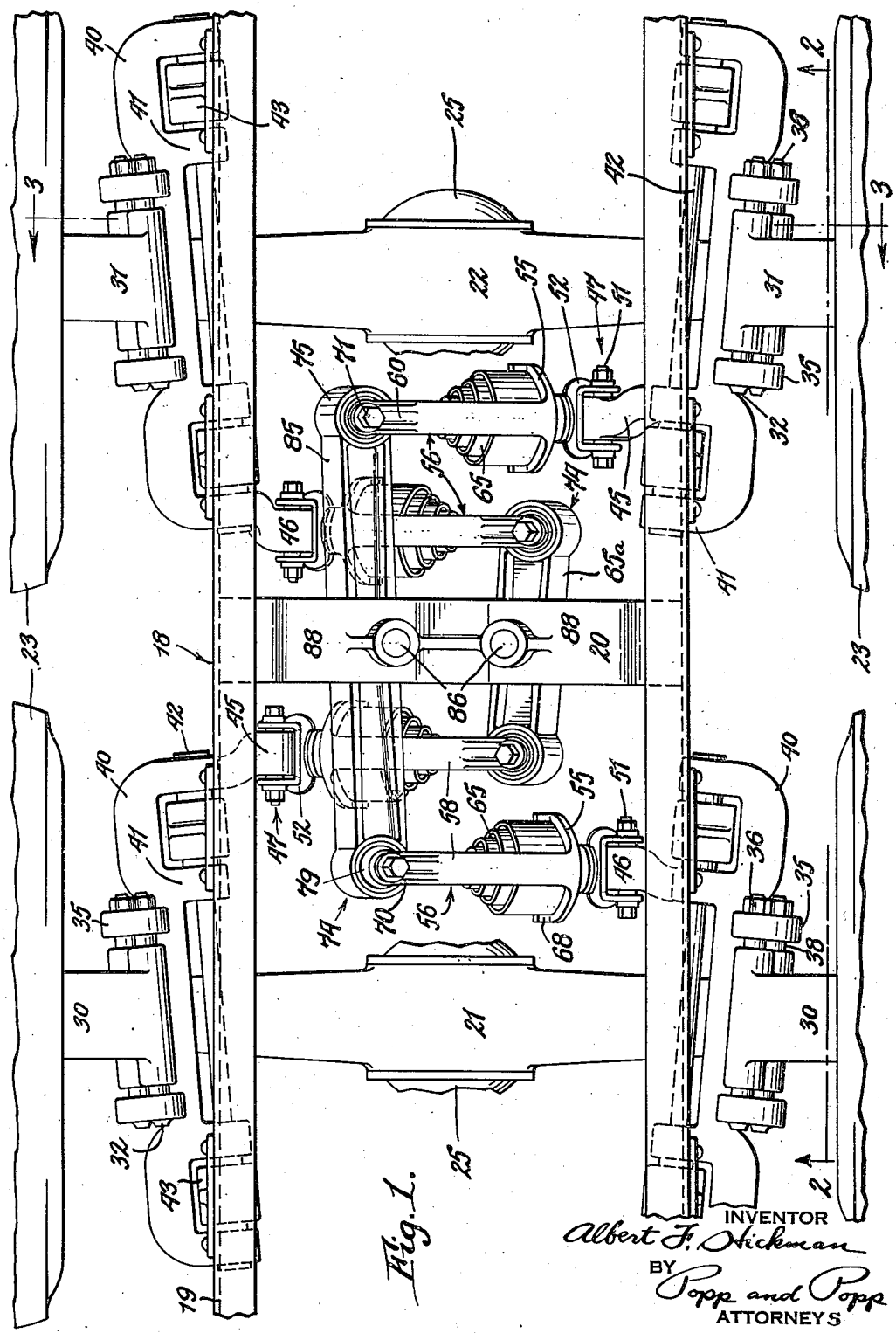
Fig. 1 is a top plan view of a tandem axle spring suspension embodying my invention.
Figure 2:
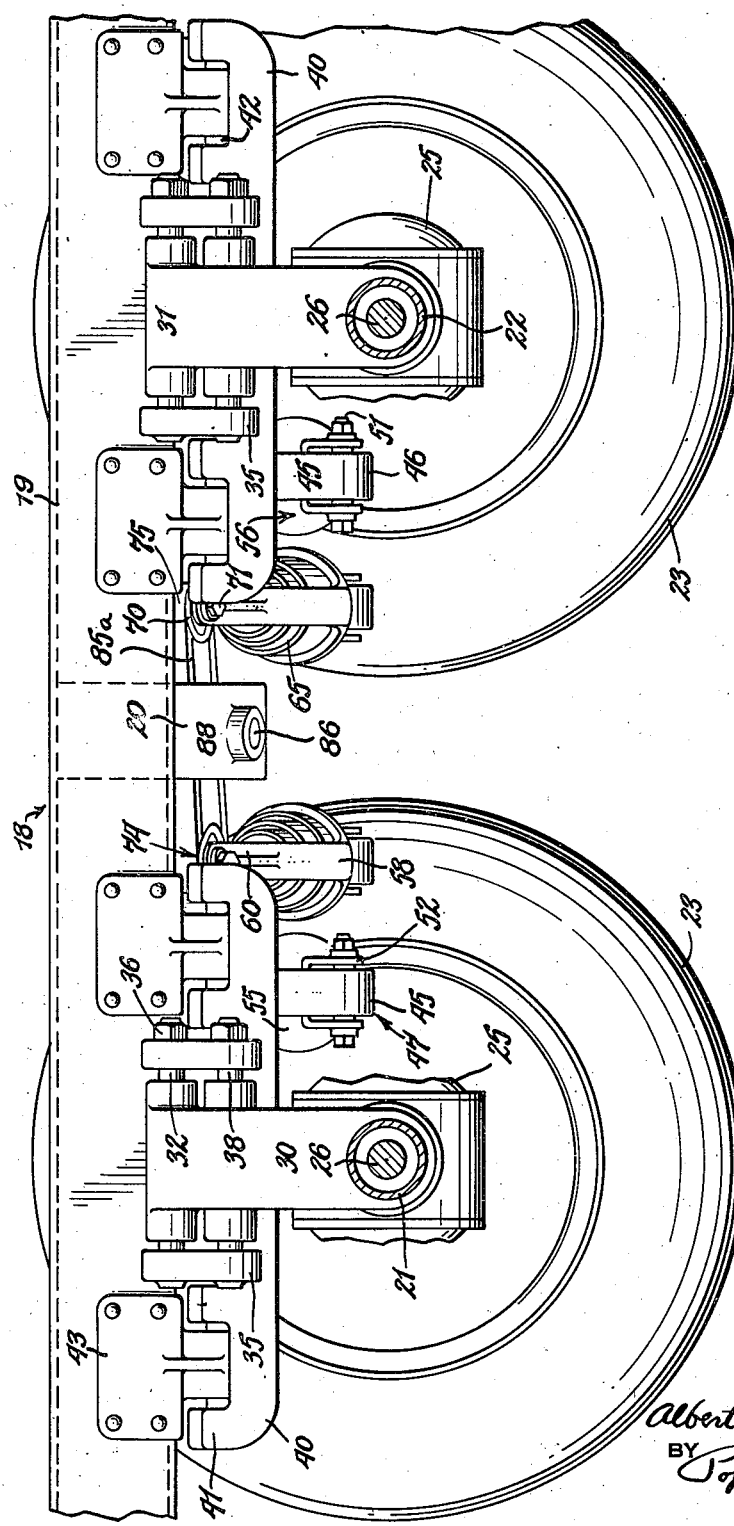
Fig. 2 is a vertical longitudinal section thereof, taken on line 2—2, Fig. 1.

The invention is shown in connection with a highway vehicle, although the invention is also applicable to railroad cars or other land vehicles. The frame 18 of the vehicle is shown as including a pair of longitudinal side frame bars 19 suitably joined together transversely by cross frame bars 20 in the usual and well known manner. Frequently, in modern practice, the imposed loads are transmitted directly from the vehicle spring suspension to the body in which case the "frame" is little more than a template. In Figs. 1-5 the frame is shown as supported by a pair of tandem axles 21 and 22 which are supported by wheels 23, these wheels being rotatably secured to the axles. One or both pair of wheels can be drive wheels, each axle being shown as provided for this purpose with a differential housing 25 through which power is transmitted to the drive axle shafts 26 housed within the axles and which are secured to the wheels 23 in the usual and well known manner.

Figure 3:
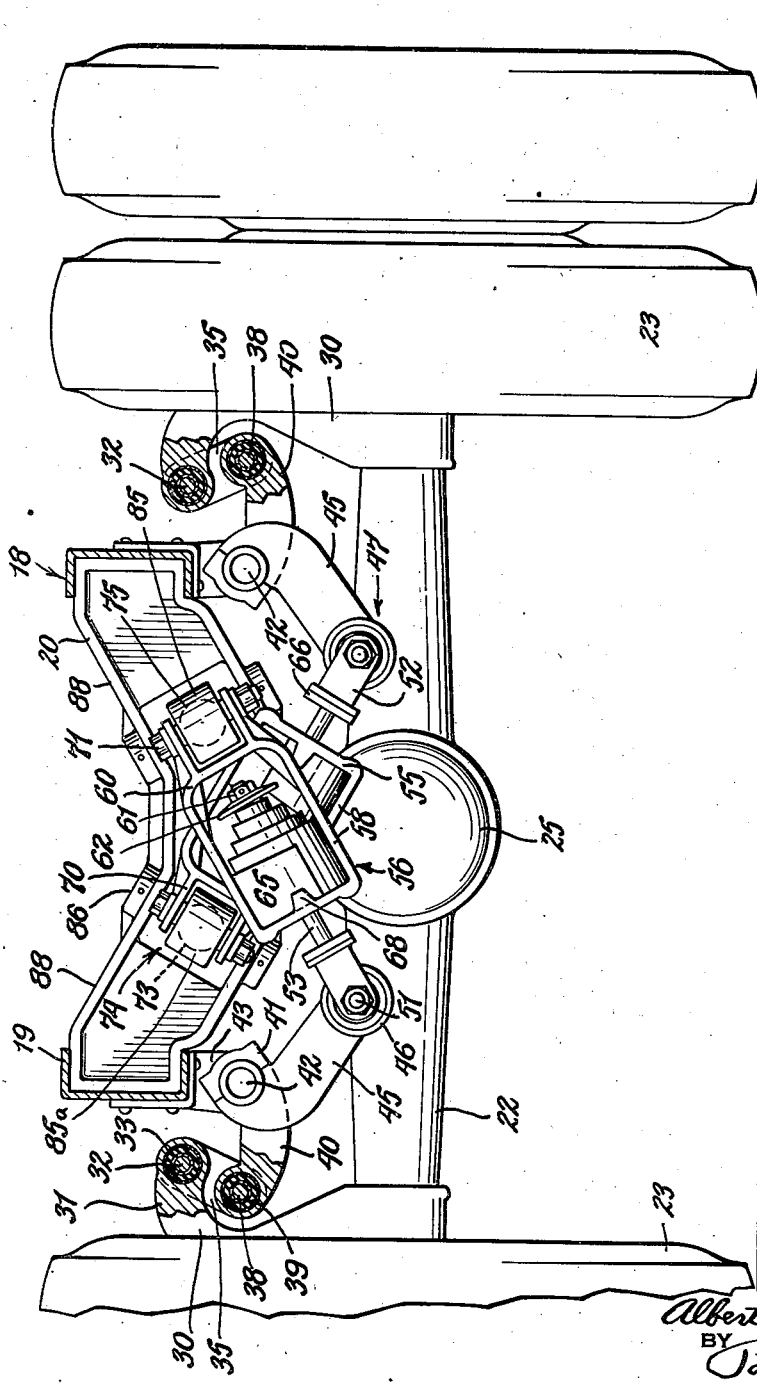
Fig. 3 is a transverse section thereof, taken on line 3—3, Fig. 2.

To each end of each axle is secured an axle bracket 30 which is fast to the axle and extends upwardly therefrom and is formed to provide an inwardly projecting arm or horn 31 at its upper end. At its inner upper extremity this axle bracket 30 carries an axle pivot pin 32 which, as best shown in Fig. 3, is preferably mounted in a rubber sleeve 33 which is shown as arranged between inner and outer metal sleeves, the inner one of which is tightly fitted around the axle pivot pin 32 and the outer one of which is tightly fitted in a bore provided through the upper inner end of the axle bracket 30. The rubber bushing 33 between each axle bracket 30 and its axle pivot pin 32 permits the axle pivot pin 32 to oscillate in the axle bracket the necessary extent to permit vertical and lateral movement of each axle bracket relative to the frame 18 as hereinafter described and avoids the necessity of providing a bearing which requires lubrication or which may become noisy.

Referring to Fig. 1 it will be noted that the axle pivot pins 32 slant forwardly and inwardly relative to the longitudinal axis of the frame 18 or, in other words, the axle pivot pins 32 for each axle "toe in." This arrangement of these axle pivot pins 32, together with the corresponding arrangement of the other pivotal connections, as hereinafter described, renders the axles self-steering in rounding curves.

A shackle 35 is secured to each end of each axle pivot pin 32, one of these shackles being preferably secured to each axle pivot pin by welding and the other being preferably secured by a nut 36 so that the axle pivot pin can be readily removed. The other ends of each pair of shackles 35 are similarly secured to the opposite ends of a crank arm pivot pin 38, this crank arm pivot pin 38 being tightly fitted in a rubber bushing 39 which is in turn tightly fitted in a bore at the outer end of a crank arm 50. As with the rubber bushing 33, the rubber bushing 39 is preferably held between inner and outer sleeves which are in turn tightly fitted to the crank arm pivot pin 38 and the bore of the crank arm 40.

Each crank arm 40 is journalled at a plurality of places on the frame 18 of the vehicle and for this purpose each crank arm is extended a substantial extent lengthwise of the vehicle and each crank arm is provided at its front and at its rear end with a pair of spaced knuckles 41 which embrace the corresponding parts of a journal pin 42 which pivotally connects the crank arm to the frame. Each frame journal pin 42 is shown as connected to the longitudinal side bars 19 of the frame by a pair of frame bearings 43.

To one of the knuckles 41 of each crank arm 40 is secured, in any suitable manner, a lever arm 45 which, as best shown in Fig. 3, extends downwardly and inwardly under the body or frame of the vehicle. This lever arm 45 is of approximately the same effective length but slightly longer than the crank arm 40 to which it is connected. At its inner end each of these lever arms 45, as best shown in Fig. 4, is formed to provide a tubular socket 46 of a ball-and-socket joint 47, a bearing 48 being arranged in this socket and this bearing being formed to embrace a ball 49. The material of the bearing 48 is preferably such that a lubricant is incorporated in the material of which the bearing is made and the bearing is preferably held in a sleeve 50 which is tightly fitted in the bore of the tubular socket 46 so that the bearing surfaces are at the ball 49.

A pin 51 extends through this ball 49 and axially through the bore of the tubular socket 46 and to the opposite ends of this pin are secured the arms of a U-shaped yoke 52. To the central cross part of this yoke is welded a rod 53 which extends horizontally inward and through a hole 54 in the outer end wall 55 of a rectangular frame or yoke 56, this yoke having upper and lower bars and a cross head 60.

On the inner threaded end of the rod 53 is screwed and pinned a head 61, this head having an annular flange 62 which provides a broad flat circular face opposing the end wall 55. Between this end wall 55 of the yoke and the opposing flat face of the head 61 is interposed a volute spring 65. This volute spring is composed of a strip or plate of spring steel formed into a spiral with the several convolutions progressively offset axially to form a volute. The inner small convolution at one end of the volute spring 65 surrounds the rod 53 and engages the head 61 at the end of this rod. The large convolutions at the opposite end of the volute spring engages the end wall 55 of the yoke 56, this end wall being preferably of circular form for this purpose as best shown in Fig. 5. To prevent noise in the operation of the rod 53 in the yoke 56, a rubber buffer 66 is preferably secured to the yoke 52 around the rod 53 in position to engage the end wall 55 of the yoke 56. The large end of the volute spring 65 is preferably centered on the end plate 55 of the yoke by fingers 68.

The cross head 60 of the yoke 56 is formed to provide a pair of ears 70 arranged one above the other and through which a vertical bolt 71 extends, this bolt being held in place by its nut 72. This bolt extends through the ball 73 of a ball-and-socket joint 74 this ball being held within a tubular socket 75 by a self oiling bearing 76, this bearing 76 having a sleeve 78 fitted in the bore of the tubular socket 75 and embracing the ball 73 in the same manner as with the ball-and-socket joint 47. Both of these ball-and-socket joints 47 and 74 can have dust seals provided by rubber disks or flanges 79 fitted to the end hubs of the balls 49 and 73 and engaging the corresponding ends of the socket or a retaining ring 80 which holds the corresponding bearing 48 or 78 in the socket.

The sockets 75 are formed at the opposite ends of equalizing arms 85 and 85a. These arms are identical except that one is shorter than the other to accommodate the action of the parts. Each of these arms is pivoted at its center, as indicated at 86 to the main frame of the vehicle so as to transfer the excess load on either axle to the other. For this purpose the cross bar 20 of the frame 18 is arched downwardly as indicated in Fig. 3, so as to provide two downwardly and inwardly inclined side parts 88 each of which is generally parallel with the axis of the two volute spring shackles 56 for the ends of the axles on the opposite side of the vehicle. The pivots 86 are shown as being in the form of pivot pins which extend through the inclined side parts 88 of the frame cross bar 20 and hence support each equalizing bar 85, 85a to swing in a plane parallel to the axes of the volute spring shackles 56 to which it is connected at its opposite ends. It will be noted that the volute spring shackles 56 for, say, the right hand ends of the axles 21 connect with the equalizing bar 85a at the left hand side of the vehicle, and that, conversely, the volute spring shackles 56 for the left hand ends of the axles 21 connect with the equalizing bar 85 at the right hand side of the vehicle, there being thereby a cross over of the suspensions for the opposite ends of the axles as illustrated in Figs. 1 and 3. This cross over is necessary to secure the desired action of the spring suspension in a relatively narrow vehicle such as a highway truck or trailer.

In the operation of the suspension the upward movement of one axle end, say the left hand end of the front axle 21, through its shackles 35, swings the outer end of its crank arm 40 upwardly, this crank arm rotating about the axis of its pivotal connection 41 with the frame of the vehicle. This movement of this crank arm 40 is upward and inward and since the lever arm 45 is connected to the hub of this crank arm 40 to extend downwardly and inwardly this movement of the crank arm 40 effects a downward and outward movement of the lever arm 45. Through its ball-and-socket joint 47 this downward and outward movement of the inner end of the lever arm 45 draws the rod 53 longitudinally outward thereby, through the head 61, Fig. 4, exerting axial pressure on the end of the small convolution of the volute spring 65. This compresses the volute spring against the circular end wall 55 of its rectangular frame or yoke 56, the spring providing the necessary resilient resistance to such upward movement.

With tandem axles it is important to provide for the transfer of the excess load on the end of one axle to the same end of its companion axle, the total load being thereby distributed between the two axles. For this purpose the pressure of the volute spring 65 associated with the assumed left hand end of the front axle 21 moves its shackle 56 outwardly and downwardly, this motion being transmitted through the ball-and-socket joint 74 to the front end of the equalizing lever 85. This swings this equalizing lever counterclockwise as viewed in Fig. 1 and, since this equalizing lever is pivoted to the frame at 86, moves the ball-and-socket joint 74 at its opposite end toward the right hand side of the vehicle.

This effects a corresponding movement of the shackle 56 for the rear left volute spring 65 and exerts axial upward and inward pressure against the large convolutions thereof. This pressure is transmitted through this volute spring 65 to the head 61 of its rod 53 thereby, through the corresponding ball-and-socket joint 47, drawing the lever arm 45 for the rear left wheel upwardly and inwardly. This effects a downward movement of the crank arm 40 associated with the rear left wheel and through the links 35 imposes a downward pressure on this wheel. It will therefore be seen that an excess load on either end of either axle is transmitted to the same end of its companion axle thereby to equalize the loads carried by the axles. The proportions of the load carried by the two axles can, of course, be varied, as by adjusting the location of the pivots 86 along the equalizing bars 85, 85a but in any event a transfer of excess loads from one axle to the other is effected.

It will be noted that the shackles 35 are inclined upwardly and inwardly from the crank arm pivot pins 38 to the axle pivot pins 32. This upward and inward inclined arrangement of the shackles tends to cause each axle to centralize itself in a direction transverse of the frame and enables the action of gravity to geometrically and resiliently resist any such movement of either axle away from its central position. This permits the vehicle frame 18 to move substantially straight ahead despite a certain amount of lateral movement of the axle. This arrangement of the shackles further provides high and wide pivot positions which provides increased stability in that it provides effective spring centers which can be as wide or wider than the track of the vehicle. Further this arrangement of the shackles reduces sidesway, the high and wide pivot positions, together with the upward and inward slant of the shackles, providing a suspension in which the frame 18 is more nearly suspended than mounted. Other important advantages which flow from the inclined arrangement of the shackles are the reduction in the possibility of wheel tramp and in the elimination of the need for anti-body roll devices, such as torsion bar stabilizers.

When the vehicle is traveling straight ahead, if the tandem axles 21, 22 are not parallel for any reason, they will automatically assume a parallel position because of the fact that if, for example, the rear axle 22 is out of line it will tend to follow a horizontal arc and this tendency, due to the lateral friction between the tires and the roadway, will cause a lateral movement of the axle relative to the frame. Due to the fact that the shackles 35 normally extend upwardly and inwardly and also due to the fact that the axes of the axle pivot pin 32, crank arm pivot pin 38 and frame pivot pin 42 for each wheel incline forwardly and inwardly or "toe in" as shown in Fig. 1, this lateral movement is automatically caused to be translated into a slight turning movement of the whole axle, and this turning movement will continue until both the tandem axles are in line with each other. Such a movement, naturally, causes a slight change in the angularity of the shackles 35 at the opposite ends of each axle and this change is resisted by gravity which, due to the obliquity of the shackles, is caused to act in a geometric manner.

The fact that the tandem axles 21, 22 "trail" each other also occurs when the vehicle is making a turn on the road. In this case, just as when going straight ahead, the tires naturally tend to push the axle laterally and, as a consequence, the whole axle moves obliquely to eliminate this scuffing. Thus when the vehicle is making a turn, the tandem axles are caused to automatically move to such oblique position relative to each other as will cause their axes to intersect the axes of revolution of the two front wheels and will enable the vehicle to make the turn without tire scuffing. This action occurs when either the vehicle is steered around a long turn in the road or if it is steered sharply on a straight road as, for instance, when overtaking a slow vehicle ahead, or otherwise avoiding some obstruction. It will also be seen that this action also takes place to some extent when a tendency to tire scuffing occurs because of one wheel or a pair of wheels at one end of an axle having a diameter different from the diameter of the wheel or pair of wheels at the other end of the same axle.

The modified form of volute spring yoke shown in Figs. 6–8 is provided with two volute springs which are arranged to act in conjunction with each other, one of these volute springs being relatively light so as to provide a soft spring action when the vehicle is traveling light or empty and the other volute spring being relatively heavy and powerful and serving to provide adequate resilient resistance under heavy load conditions when the light volute spring bottoms or has exerted substantially its maximum resistance. As with the form of the invention shown in Figs. 1–5 the yoke is connected to the free arm of the lever arm 46 through a ball-and-socket joint 47a which is similar to the ball-and-socket joint 47 shown in Figs. 1–5 and comprises a pair of arms 88 carrying a horizontal bolt 89 which in turn carries a ball 90. This ball is fitted in a self oiling bearing 91, the cylindrical periphery of which is encased in a metal sleeve 92 which is in turn fitted in a cylindrical socket member 93. Dust seals 94 can be provided at the ends of the socket member 93.

The socket member 93 connects with a rod 95, this rod extending through an opening in the end wall 96 of a yoke 98, a rubber buffer being provided to cushion any impact of the socket member 93 against the end wall of the yoke 98. As with the form of the invention shown in Figs. 1–5, the rod 95 is provided with a head 96 which bears axially against the small end convolution of a relatively heavy or powerful volute spring 99 which surrounds the rod 95.

However, the large end convolutions of this spring 99, instead of being seated directly on the end wall of the yoke, bear against a round plate 100 which is slidingly mounted in the yoke 98 for movement along the axis of the yoke. The plate 100 is provided with axially extending fingers 101 for holding the large convolutions of the volute spring 99 in centered relation and two of these fingers 101 also serving as guide lugs. The opposite side of the plate 100 is provided with an axially extending centering bead 102 which serves to center the large convolutions of a second and relatively light volute spring 105, the small end convolution of this light volute spring surrounding the rod 95 and bearing against the end wall 96 of the yoke 98 around the opening therein through which the rod 95 extends.

The end wall 96 of the yoke 98 is connected to a socket 108 of a ball-and-socket joint 74a by a pair of oppositely located integral bars 109. These bars are provided with longitudinal slots 110 in which the corresponding guide lugs 101 slide, these guide lugs preventing the plate 100 from turning and also guiding it in its movement axially of the yoke.

The ball-and-socket joint 74a is generally similar to the ball-and-socket joint 74 of the form of the invention shown in Figs. 1–5 and serves to connect the volute spring yoke 98 with the corresponding end of an equalizing bar 85. In the socket 108 is fitted a bearing 111 which houses a ball 112. Through this ball a bolt 113 extends, this bolt securing this ball to arms 114 provided at the corresponding end of the equalizing bar 85.

Accordingly it will be seen that when a light load is carried substantially all of the resilient resistance is supplied by the light volute spring 105, this providing a soft ride for the vehicle when empty. Under heavy load conditions, however, the light volute spring is compressed to a degree where it offers a high resistance or actually bottoms to provide a solid wall between the plate 100 and the end wall 96 of the yoke. When this occurs the resilient resistance is supplied by the heavy and more powerful volute spring 99. It will therefore be seen that by the selection of the characteristics of the volute springs 99 and 105, variable rate springing can be provided in the suspension as may be desired.

In Figs. 9 and 10 the invention is shown as applied to a single axle. With such an application there is no need, of course, for the equalizing bars to provide for load distribution from one axle to the other. Consequently with a single axle the ball-and-socket joint 74a for each axle end can be connected directly to the frame 18 by a bracket 115. Since in all other respects the form of the invention shown in Figs. 9 and 10 is identical to that shown in Figs. 1–5, with the modified form of yoke 98 shown in Figs. 7 and 8, the same reference numerals have been employed and the description is not repeated.

From the foregoing it will be seen that the present invention provides a spring suspension attaining the objects and having the many operating and structural advantages set forth in a simple direct and positive manner and in a structure which is not subject to wear or frequent service attention.

I claim as my invention:

1. A vehicle spring suspension for connecting the frame and axle of a vehicle, comprising a crank arm pivoted longitudinally on one side of said frame and normally extending horizontally outward from its pivotal connection with said frame, a lever arm pivoted longitudinally on said frame and operatively connected with said crank arm to rotate therewith and normally extending downwardly and inwardly from its pivotal connection with said frame, means operatively connecting the free end of said crank arm with the corresponding end of said axle, and spring means connecting the free end of said lever arm and the opposite side of said frame.

2. A vehicle spring suspension for connecting the frame and axle of a vehicle, comprising a crank arm pivoted longitudinally on one side of said frame and normally extending horizontally outward from its pivotal connection with said frame, a lever arm fast to said crank arm and normally extending downwardly and inwardly from said pivotal connection with said frame, means operatively connecting the free end of said crank arm with the corresponding end of said axle, spring means connected at one end to the free end of said lever arm and extending upwardly and inwardly therefrom, and means securing the upper end of said spring means to the opposite side of said frame.

3. A vehicle spring suspension for connecting the frame and axle of a vehicle, comprising a short crank arm pivoted longitudinally on one side of said frame and normally extending horizontally outward from its pivotal connection with said frame, a lever arm fast to said crank arm and normally extending downwardly and inwardly from said pivotal connection with said frame, the effective length of said lever arm being longer than the effective length of said crank arm, means operatively connecting the free end of said crank arm with the corresponding end of said axle, spring means connected at one end to the free end of said lever arm and extending upwardly and inwardly therefrom, and means securing the upper end of said spring means to the opposite side of said frame.

4. A vehicle spring suspension for connecting the frame and axle of a vehicle, comprising a crank arm pivoted longitudinally on one side of said frame and normally extending horizontally outward from its pivotal connection with said frame, a lever arm fast to said crank arm and normally extending downwardly and inwardly from said pivotal connection with said frame, means operatively connecting the free end of said crank arm with the corresponding end of said axle, a compressison spring arranged at the free end of said lever arm and extending upwardly and inwardly therefrom, means connecting the free end of said lever arm with the upper end of said compression spring, a yoke surrounding and bearing against the lower end of said compression spring, and means pivotally connecting said yoke with the opposite side of said frame.

5. A vehicle spring suspension for connecting the frame and axle of a vehicle, comprising a crank arm pivoted longitudinally on said frame and normally extending horizontally outward from its pivotal connection with said frame, a lever arm fast to said crank arm and normally extending downwardly and inwardly from said pivotal connection with said frame, means operatively connecting the free end of said crank arm with the corresponding end of said axle, a rod pivotally secured to the free end of said lever arm and extending upwardly and inwardly therefrom, a compression spring surrounding said rod, a head at the upper end of said rod and bearing against the corresponding end of said compression spring, a yoke surrounding said compression spring and bearing against the lower end thereof, and means pivotally connecting said yoke with said frame.

6. A vehicle spring suspension for connecting the frame and axle of a vehicle, comprising a crank arm pivoted longitudinally on said frame and normally extending horizontally outward from its pivotal connection with said frame, a lever arm fast to said crank arm and normally extending downwardly and inwardly from said pivotal connection with said frame, means operatively connecting the free end of said crank arm with the corresponding end of said axle, a rod extending upwardly and inwardly from the free end of said lever arm, and universal joint connecting said free end of said lever arm with the lower end of said rod, a compression spring surrounding said rod, a head at the upper end of said rod and bearing axially against the corresponding end of said compression spring, a yoke surrounding said compression spring and bearing against the lower end thereof, and a universal joint connecting the upper end of said yoke with said frame.

7. A vehicle spring suspension for connecting the frame and axle of a vehicle, comprising a crank arm pivoted longitudinally on said frame and normally extending horizontally outward from its pivotal connection with said frame, a lever arm fast to said crank arm and normally extending downwardly and inwardly from said pivotal connection with said frame, means operatively connecting the free end of said crank arm with the corresponding end of said axle, a rod extending upwardly and inwardly from the free end of said lever arm, a universal joint connecting said free end of said lever arm with the lower end of said rod, a pair of spiral compression springs of different strength arranged axially end-to-end and surrounding said rod, a plate interposed between the adjacent ends of said compression springs, a head at the upper end of said rod and bearing axially against the corresponding end of said pair of compression springs, a yoke surrounding said pair of compression springs and bearing against the lower end thereof, guide means on said yoke and engaging a part of said plate to guide its movement axially of said rod, and a universal joint connecting the upper end of said yoke with said frame.

8. A vehicle spring suspension for connecting the frame and axle of a vehicle, comprising an axle pivot connected to said axle, a yoke crank arm pivoted longitudinally on one side of said frame and normally extending horizontally outward from its pivoted connection with said frame, a crank arm pivot at the outer end of said crank arm, a lever arm fast to said crank arm and normally extending downwardly and inwardly from said pivotal connection with said frame, a shackle pivoted at its upper end on said axle pivot and at its lower end on said crank arm pivot and permitting movement of said axle laterally with reference to said frame, said shackle extending upwardly and inwardly from said crank arm pivot when said crank arm is in a horizontal position, spring means connected at one end to the free end of said lever arm and extending upwardly and inwardly therefrom, and means securing the upper end of said spring means to the opposite side of said frame.

9. A tandem axle vehicle spring suspension, comprising a frame, two axles having wheels journalled thereon, a crank arm pivoted longitudinally on said frame adjacent each end of each of said axles and normally extending horizontally outward from its pivotal connection with said frame, means operatively connecting the free end of each crank arm with the corresponding end of one of said axles, a lever arm associated with each of said crank arms and pivoted longitudinally on said frame and operatively connected with its crank arm to rotate therewith, a spring associated with each of said lever arms and each operatively connected with the free end of its lever arm, equalizing bars each pivoted at its center to said frame, and means connecting the opposite ends of each of said equalizing bars to the springs associated with the companion ends of said axles to effect a transfer of excess load from one axle to the other.

10. A tandem axle vehicle spring suspension, comprising a frame, two axles each having wheels journaled thereon, a crank arm pivoted longitudinally on said frame adjacent each end of each of said axles and normally extending horizontally outward from its pivotal connection with said frame, a lever arm associated with each of said crank arms and pivoted longitudinally on said frame and operatively connected with its crank arm to rotate therewith and normally extending downwardly and inwardly from its pivotal connection with said frame, means operatively connecting the free end of each crank arm with the corresponding end of one of said axles, spring means connected to the free end of each of said lever arms and extending axially upwardly and inwardly therefrom, equalizing bars each connected at its opposite ends to the upper ends of the spring means associated with the companion ends of said axles, and means centrally pivoting each equalizing bar to said frame to swing in a plane substantially coinciding with the axes of the spring means to which it is connected.

11. A tandem axle vehicle spring suspension, comprising a frame, two axles each having wheels journaled thereon, a crank arm pivoted longitudinally on said frame adjacent each end of each of said axles and normally extending horizontally outward from its pivot connection with said frame, means operatively connecting the free end of each crank arm with the corresponding end of one of said axles, a volute spring operatively connected with each of said crank arms, and equalizing member rotatably secured intermediate its ends to said frame at each side thereof adjacent said axles, and means connecting the opposite ends of each of said equalizing members to the volute springs associated with the companion ends of said axles to effect a transfer of excess load from one axle to the other.

12. A tandem axle vehicle spring suspension, comprising a frame, two axles having wheels journaled thereon, a crank arm pivoted longitudinally on said frame adjacent each end of each of said axles and normally extending horizontally outward from its pivotal connection with said frame, means operatively connecting the free end of each crank arm with the corresponding end of one of said axles, a lever arm associated with each of said crank arms and pivoted longitudinally on said frame and operatively connected with its crank arm to rotate therewith, a volute compression spring associated with each of said lever arms and each operatively connected with the free end of its lever arm, equalizing bars each pivoted at its center to said frame, and means connecting the opposite ends of each of said equalizing bars to the springs associated with the companion ends of said axles to effect a transfer of excess load from one axle to the other.

13. A tandem axle vehicle spring suspension, comprising a frame, two axles each having wheels journaled thereon, a crank arm pivoted longitudinally on said frame adjacent each end of each of said axles and normally extending horizontally outward from its pivotal connection with said frame, a lever arm associated with each of said crank arms and pivoted longitudinally on said frame and operatively connected with its crank arm to rotate therewith and normally extending downwardly and inwardly from its pivotal connection with said frame, means operatively connecting the free end of each crank arm with the corresponding end of one of said axles, volute compression spring means connected to the free end of each of said lever arms and extending axially upwardly and inwardly therefrom, equalizing bars each connected at its opposite ends to the upper ends of the spring means associated with the companion ends of said axles, and means centrally pivoting each equalizing bar to said frame to swing in a plane substantially coinciding with the axes of the spring means to which it is connected.

ALBERT F. HICKMAN.